C. VOLLMER.
UTENSIL CLEANING AND GREASING MACHINE.
APPLICATION FILED JUNE 8, 1911.
1,029,733.
Patented June 18, 1912.
6 SHEETS—SHEET 1.
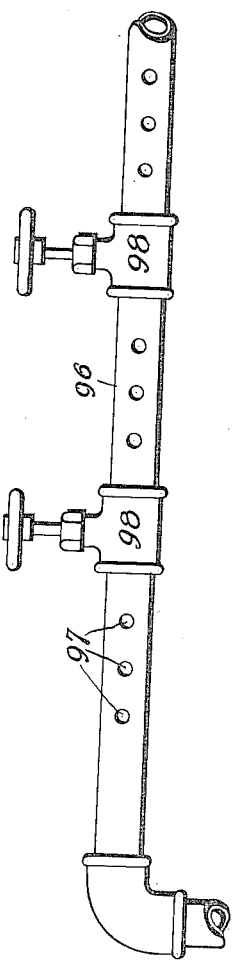
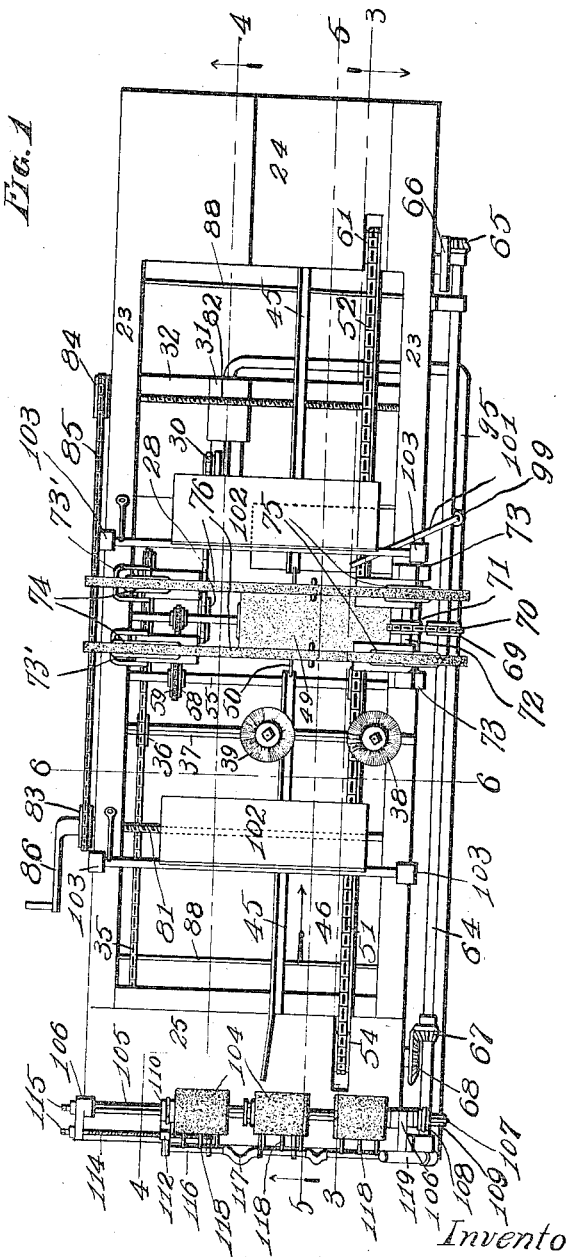
Witnesses
W. C. Stein
M. G. Lindsay.
Inventor
Charles Vollmer
by Alfred A. Ticks atty.

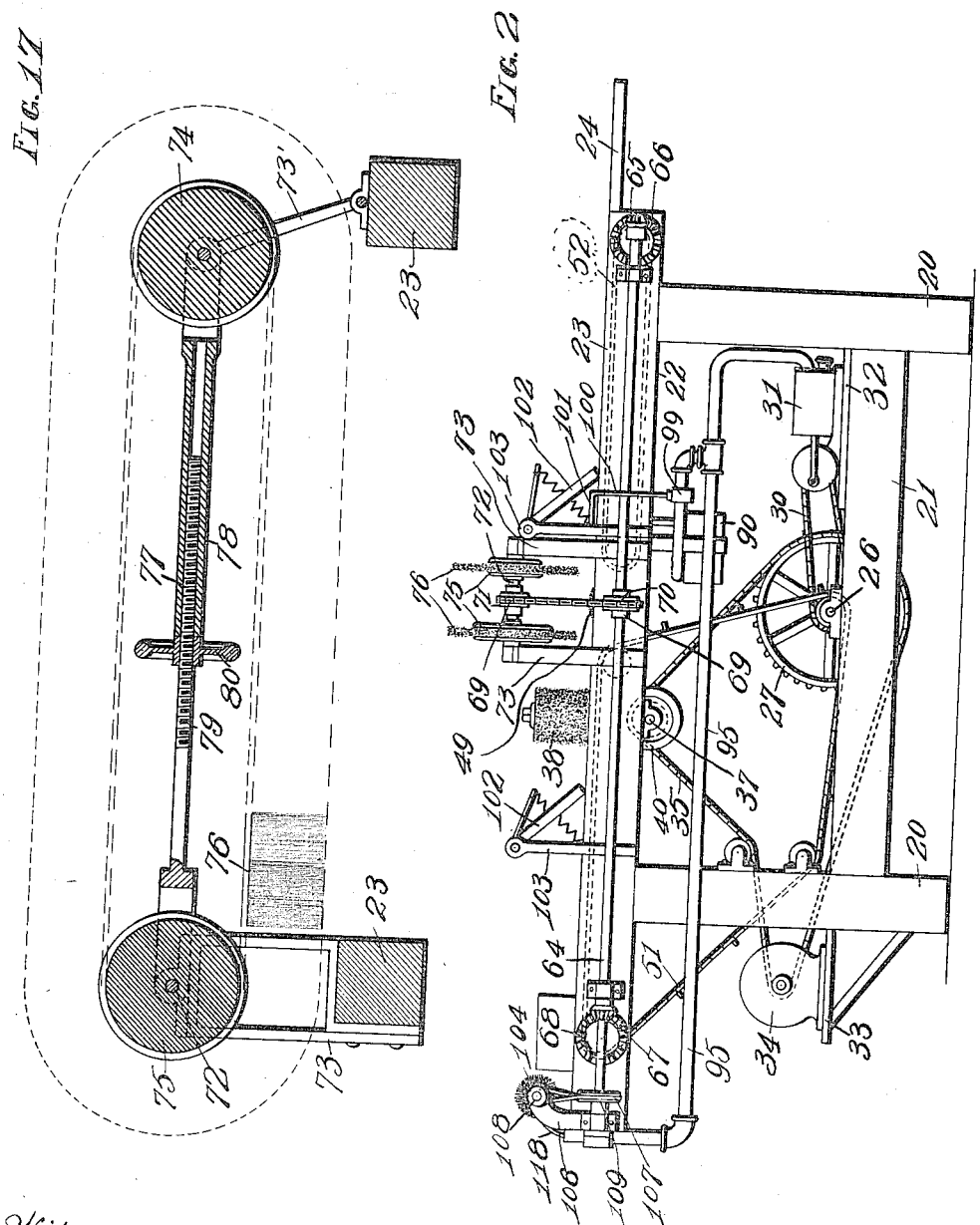

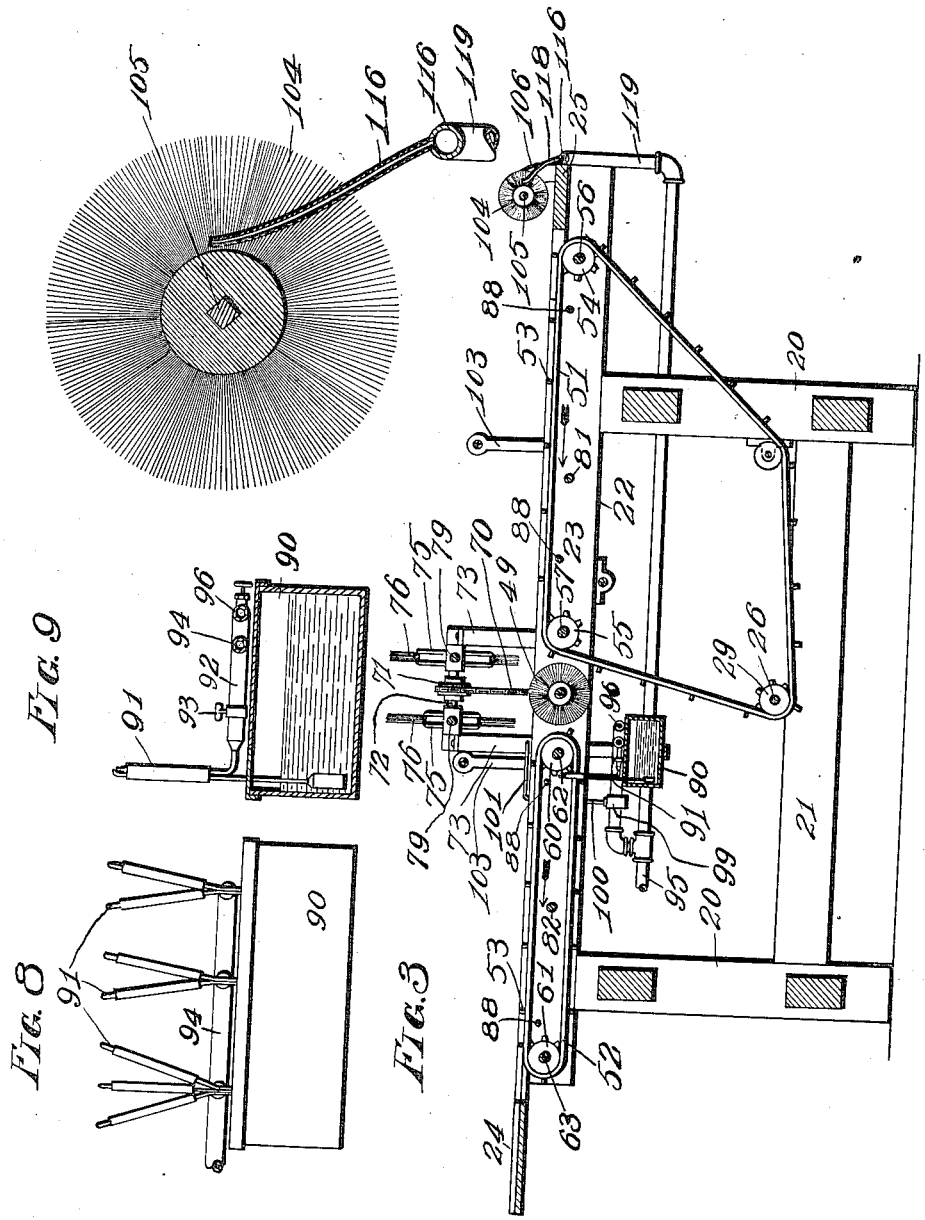

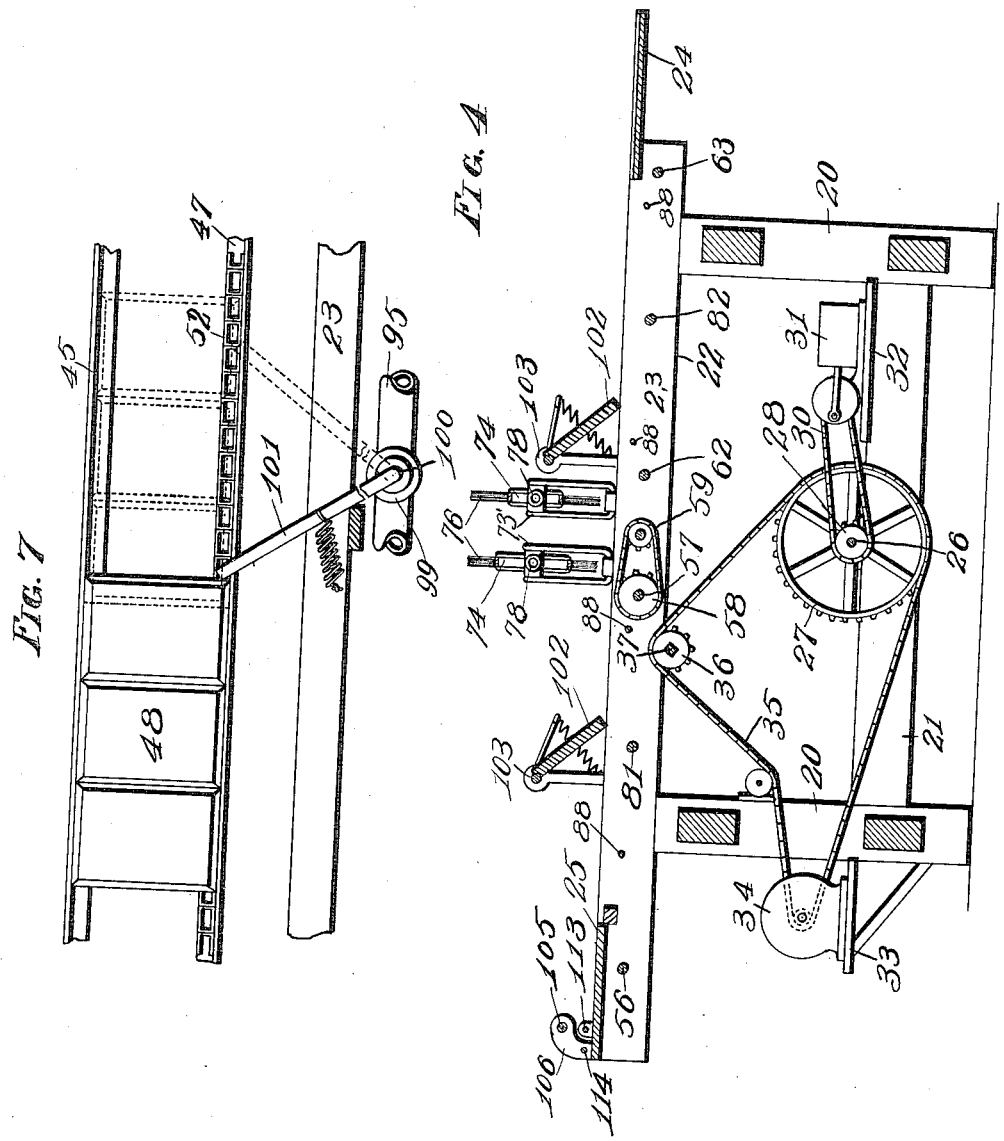

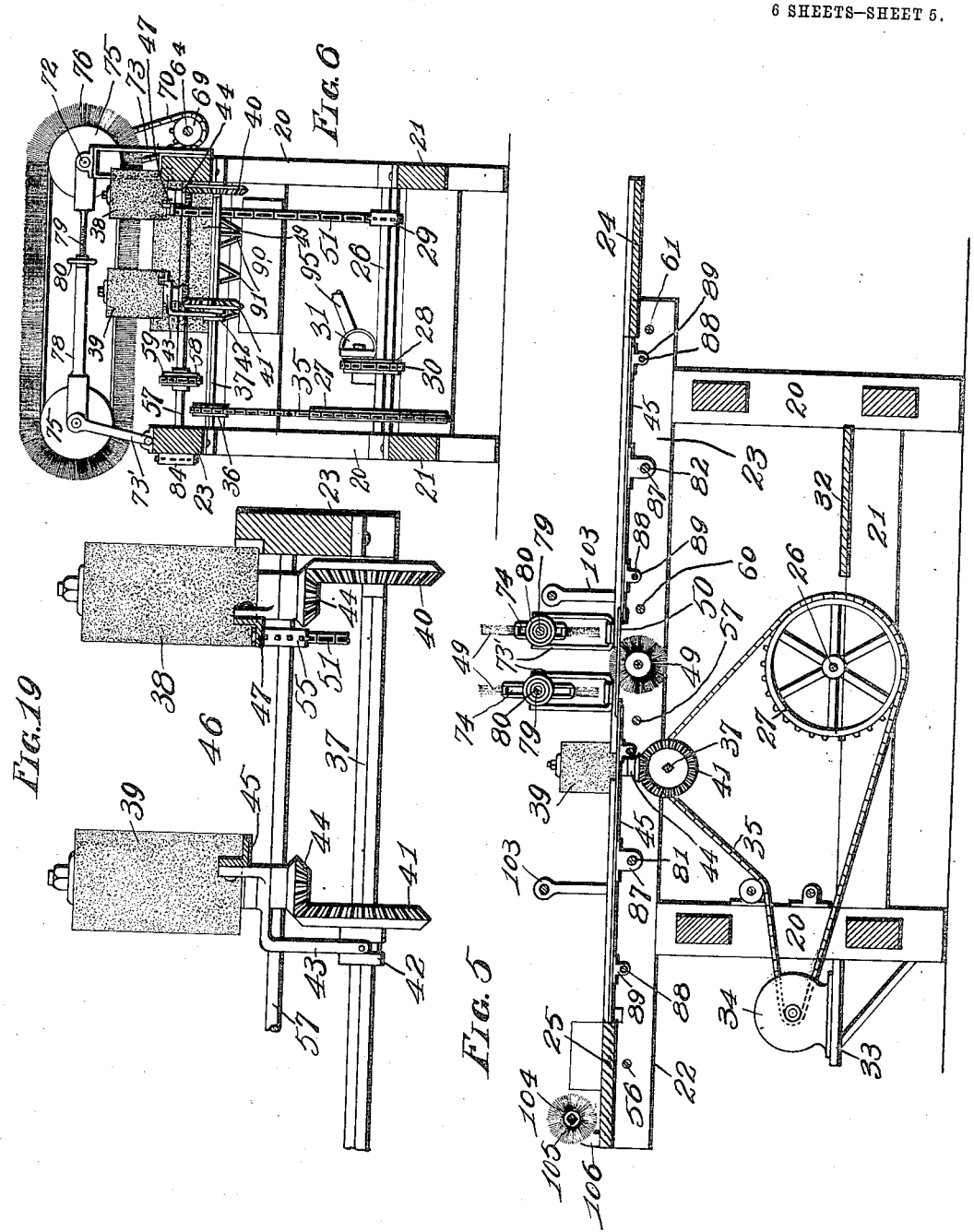

C. VOLLMER.
UTENSIL CLEANING AND GREASING MACHINE.
APPLICATION FILED JUNE 8, 1911.
1,029,733.
Patented June 18, 1912.
6 SHEETS—SHEET 6.
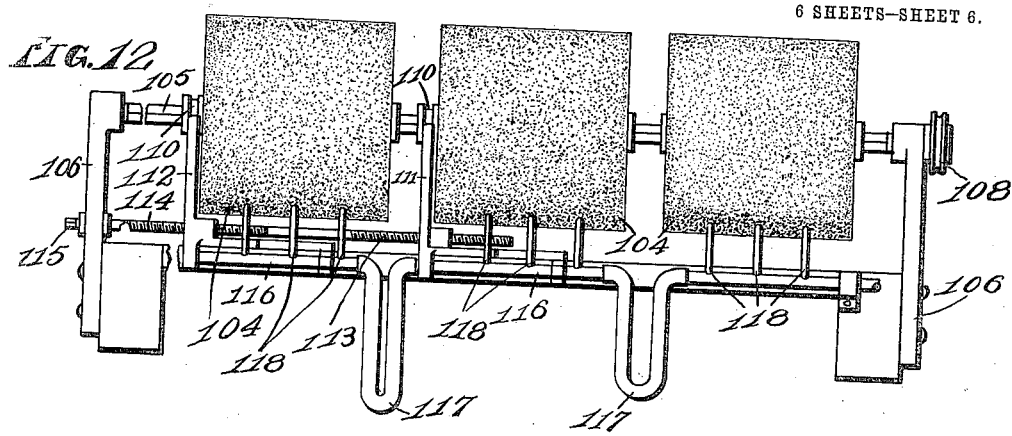
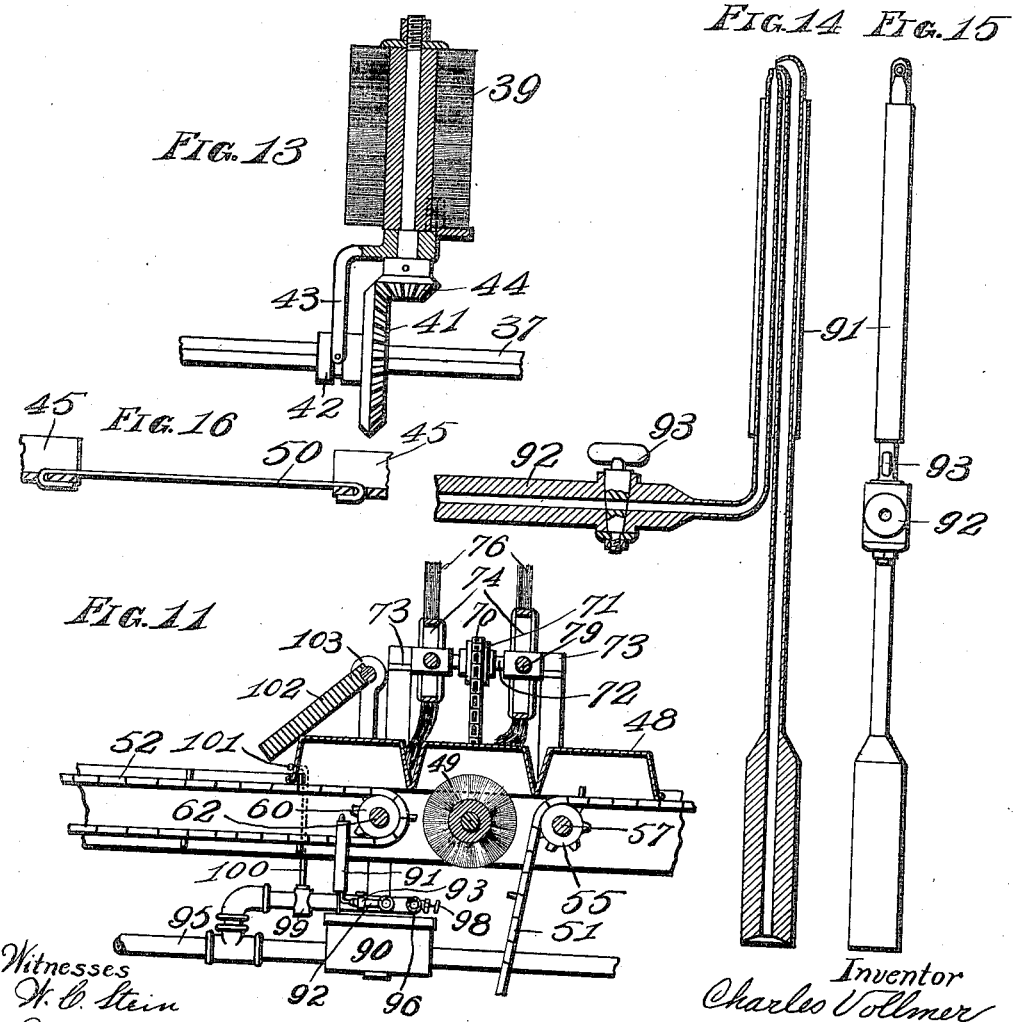
Witnesses
W. C. Stein
M. G. Lindsay
Inventor
Charles Vollmer
by Alfred A. Eicks Atty.

UNITED STATES PATENT OFFICE.

CHARLES VOLLMER, OF ST. LOUIS, MISSOURI, ASSIGNOR OF ONE-THIRD TO GEORGE N. HOFFMANN, OF ST. LOUIS, MISSOURI.

UTENSIL CLEANING AND GREASING MACHINE.

1,029,733. Specification of Letters Patent. Patented June 18, 1912.

Application filed June 8, 1911. Serial No. 632,024.

*To all whom it may concern:*

Be it known that I, CHARLES VOLLMER, a citizen of the United States, and resident of St. Louis, Missouri, have invented certain new and useful Improvements in Utensil Cleaning and Greasing Machines, of which the following is a specification.

This invention relates to improvements in utensil cleaning and greasing machines and has for its object a conveyer on which the utensils are placed and carried in contact with rotating and revolving brushes by which the interior and exterior of the utensil is cleaned, and means for spraying grease into the interior of the utensil.

A further object of my invention is to provide a machine having a traveling conveyer on which utensils are placed and conveyed between brushes, an atomizer located conveniently in the machine for spreading a coat of grease on the inner surface of the utensil after the same has been cleaned by the brushes, the travel of the utensil automatically operating the atomizer and an auxiliary brush against which the utensils are first placed for cleaning the interior before the utensil is placed on the conveyer, and an air blast for removing the loose particles from the utensil and brush.

A further object is to construct a machine with a conveyer and a plurality of brushes, the passage on which the utensil is supported for being conveyed between the brushes being arranged adjustable to accommodate various widths of utensils, the said utensil being cleaned internally and externally, and the interior provided with a coating of grease placing the utensil in readiness for the insertion of the dough.

After removing the baking utensils from the oven and the contents are removed there is always a certain amount of crust adhering to the interior of the pan; before the pan can be again utilized it is necessary to clean and grease the same removing all such particles. Heretofore the pans or utensils have been cleaned by hand, and when the same have been cleaned they are greased and nested together and conveyed to the baking department for the insertion of dough ready for a second baking. It has been found that such particles as adhered to the outer surface of the pans or utensils would become loose at times and fall into the pan below, and mix with the grease coating, thus when the dough is placed in the pan these foreign particles are baked into the bread, which is objectionable.

By my improved machine, the pans after the bread has been removed are first placed against the auxiliary brushes cleansing the interior, removing all foreign particles. The utensil is then placed bottom up on the conveyer and carried between the brushes; these brushes contacting with the sides, top and bottom, and as the utensils pass from the brushes a valve is automatically operated and a thin coat of grease applied to the interior of the pan by an atomizer mechanism and when this has been done the pan or utensil is ready to receive the dough for the next baking.

Figure 1 is a top plan view of my invention. Fig. 2 is a side view of the same. Fig. 3 is a sectional view taken on the line 3—3 of Fig. 1 viewing the same in the direction indicated by the arrow. Fig. 4 is a sectional view taken on the line 4—4 of Fig. 1 and viewing the same in the direction indicated by the arrow. Fig. 5 is a sectional view taken on the line 5—5 of Fig. 1 viewing the same in the direction indicated by the arrow. Fig. 6 is a cross sectional view taken on the line 6—6 of Fig. 1. Fig. 7 is a detail top plan view of a portion of the conveyer and machine frame showing a utensil in position and in the act of contacting with the atomizer valve. Fig. 8 is a side view of the grease receptacle and the atomizers connected therewith. Fig. 9 is a cross sectional view of the same. Fig. 10 is a detail sectional view of one of the auxiliary brushes and the air blast in connection therewith. Fig. 11 is a detail sectional view of a portion of the machine showing the brushes in relative position with the utensil as the same is in its travel. Fig. 12 is a side elevation of the auxiliary brushes and their mechanism. Fig. 13 is a detail sectional view of one of the brushes made use of for cleaning the sides of the utensil showing its operative mechanism. Fig. 14 is a vertical sectional view of one of the atomizers. Fig. 15 is an edge view of the same. Fig. 16 is a detail view of a portion of the channels for supporting the utensil showing a strand connecting the same for guiding the utensil across the gap occupied by one of the brushes. Fig. 17 is a detail sectional view of the adjusting mechanism made use of for regulating the tension of the endless revolving brush. Fig. 18 is a detail view of the blast pipe made use of in connection with the atomizer mechanism. Fig. 19 is an enlarged detail sectional view showing the guide way and the vertical rotating brushes in relative position therewith.

In carrying out my invention I provide a suitable frame composed of vertical standards 20 connected together by the cross bars 21. On the upper portion of the standards is mounted a bed frame 22 consisting of a pair of side members 23, both ends thereof terminating into tables 24 and 25. On the cross bars 21, and supported in suitable bearings is a shaft 26, the same being provided with a large sprocket wheel 27 and a pair of sprocket pinions 28 and 29. Over the pinion 28 operates a sprocket chain 30, which communicates with a sprocket pinion forming a part of the air compressor 31, the said compressor being mounted upon a shelf 32 suitably located in the frame. To the frame is also provided a bracket or suitable support 33 on which is mounted a motor 34, and from the motor power is imparted to the sprocket wheel 27 by the chain 35. This chain in turn operates the sprocket pinion 36 supported on the shaft 37, and by the rotating of this shaft the vertical rotating brushes 38 and 39 are placed in action, the relative position of the vertical brushes being clearly shown in Fig. 19.

The shaft 37 is constructed square with the exception of the ends supported in the journals and on said shaft is located a pair of bevel-gears 40 and 41, the bevel-gear 40 being secured rigidly to the shaft while the bevel-gear 41 is slidably mounted on said shaft, and said gear is also provided with a grooved collar 42 in which is secured the bifurcated lever 43, the upper end thereof acting as a journal and support for the shaft to which the brush 39 is attached. This shaft together with the shaft of the brush 38 is provided with beveled pinions 44 which mesh with the bevel-gears 40 and 41, placing said brushes in rotation by the operation of the shaft 37. To the journal of the bifurcated lever 43 is attached an angle bar 45, which acts as the adjusting member of the guide way 46, this guide way being the space between the angle bar 45 and the angle bar 47 forming the rigid or stationary member of the guide way, and in this guide way is adapted to pass the utensils 48.

The angle bars 45 and 47 are divided at a point where the horizontal rotating brush 49 is located. The ends of the angle bars 45 at this point are connected by a wire or strand 50, which bridges the gap and acts as a guide for the support of the utensil as the same is passing over this point, the wire or strand being of such thin and durable material as to pass between the bristles of the brush without interference. The utensil is conveyed along this guide way by the endless chains 51 and 52 both in combination forming a carrier and on these chains at suitable intervals apart are provided projections 53 which contact with the edge of the utensil for conveying the same forwardly, the chain 51 operating over the sprocket pinions 54 and 55 mounted upon shafts 56 and 57, the shaft 57 being also provided with a sprocket pinion 58 by which motion is imparted to the rotating brush 49 by the chain 59.

The chain 52 is mounted over the sprocket pinions 60 and 61 supported on shafts 62 and 63, the shaft 63 being driven by the shaft 64, this shaft being supported in suitable bearings and provided with a beveled pinion 65, which meshes with the internal toothed bevel-gear 66, the opposite end of said shaft provided with a beveled pinion 67 meshing with the bevel-gear 68 located upon the shaft 56, and by which said shaft is placed in rotation by means of the chain 51. On said shaft is mounted a sprocket wheel 69, on which operates a chain 70, said chain communicating with a sprocket wheel 71 mounted upon a short shaft 72, which is supported in the uprights 73 above the machine. On the opposite side of the machine is supported a pair of pivoted standards 73 between which are mounted rollers 74 and on the shaft 72 is likewise supported corresponding rollers 75. Over these rollers are placed endless belt brushes 76, the same being placed in revolution by means of the chain 70, and the tension of the brush belts is regulated by the adjusting bars 77 (see Fig. 17), these bars consisting of a tubular member 78, and a screw member 79 on which is operated an internally screw-threaded hand wheel 80, which abuts against the end of the tubular member 78, and by the manipulation of the wheel the belts can be slackened or tightened as desired.

Through the frame is passed and supported a pair of screw-threaded shafts 81 and 82, the outer ends provided with sprocket wheels 83 and 84 over which is placed an endless sprocket chain 85, the shaft 81 provided with a crank handle 86, by which the shafts 81 and 82 are simultaneously rotated by means of the crank and chain connection and by this manipulation the adjusting member of the guide way, or in other words the channel bar 45 can be adjusted to regulate the width of the passage between both angle bars. This feature is accomplished by means of the shafts 81 and 82 operating in screw-threaded lugs 87 firmly secured to the under side of the angle bars 45, and said angle bars are held in proper alinement by means of the guide rods 88 operating through the lugs 89, all of which being secured to the under side of the angle bar. When this angle bar is adjusted it carries with it the vertical rotating brush 39 and the bevel gear 41.

Beneath the bed frame and conveniently located in advance of the horizontal rotating brush 49 is a grease tank 90 in which is placed liquid grease, and in this tank is located a plurality of atomizers 91, these atomizers terminating into branches as shown in Fig. 8 and air is admitted through the pipe connection 92, and each atomizer is controlled by the valve 93, depending upon the number to be used during the operation and the width of the utensil to be supplied with grease, the pipes 92 being connected to the pipe 94 and it in turn connected to the supply pipe 95, which leads to the compressor 31. In addition to the air supply for the atomizers I provide a parallel branch 96 provided with perforations 97 (see Fig. 18), through which jets of air are admitted into the interior of the utensil for blowing out all loose particles or crumbs prior to the admission of the grease; this pipe is divided into sections and said sections being controlled by the valves 98. In the pipe 95 is located a valve 99 provided with an upwardly projecting valve stem 100, the upper end bent inwardly forming a horizontal arm or handle 101, its end projecting in the path of travel of the utensil and is for the purpose to automatically open the valve for the admission of air to the atomizer when contacted with by the traveling utensil, and the atomizers are not placed in action until the utensil is immediately over the same when a thin coating of grease is sprayed against the entire inner surface of the cleaned utensil. The utensils during this operation are always placed with the bottom up. During the travel of the utensil over the guide way, and in order to hold the same in position I provide a pair of swinging guards 102 swingingly supported in the uprights 103.

On the table or shelf 25 I provide an auxiliary cleaning device consisting of a plurality of rotating brushes 104 mounted upon a shaft 105, which is supported in brackets 106 secured to the table, this shaft being driven by a belt 107 operating over the sheaves 108 on said shaft and 109 on the shaft 64. One of the brushes on the shaft 105 is rigid while the other two are slidably mounted so as to regulate the space between each brush for the various sized compartments into which the utensil is divided. The construction of this mechanism is clearly shown in Fig. 12.

The sliding brushes are provided with grooved collars 110 in which are seated the bifurcated brackets 111 and 112, the bracket 111 being controlled by the screw 113, and the bracket 112 controlled by the screw 114 and said screws operated by placing the crank handle or wrench on the square end 115. The brackets 111 and 112 are provided with short pipes 116, the ends united by a flexible connection 117. These short pipes are provided with spray pipes 118 projecting between the bristles of the brush as shown in Fig. 10, and through these spray pipes is forced a blast of air for removing such particles from the brush and receptacle as has been removed by the rapid rotation of the brushes, the purpose of the flexible connection 117 being to accommodate the adjustment and space between said brushes, the air to these pipes being supplied by the pipe 119, which leads to the air compressor.

The operation of my invention is as follows: The machine after having been placed in operation by the motor, the operator first places the utensil against the auxiliary brush so as to thoroughly clean the interior or several compartments of the utensil; the utensil is then placed face down in the guide way on the chain 51, the projections 53 on the chain conveying the utensil forward in the direction indicated by the arrow in Fig. 1. Of course prior to this the operator adjusts the guide way in accordance with the width of the utensil, and as the utensil is being advanced forward the sides contact with the vertical rotating brushes 38 and 39, the guard 102 contacting with the top of the utensil holding the same downward, the utensil passing between the vertical brushes then passes between the horizontal rotating brush and the pair of revolving brushes which clean the bottom and top portions of the utensil. As the utensil passes from between these brushes it contacts with the handle 101 pressing it forwardly opening the air valve 99, permitting a blast of air to blow into the utensil from the jets 97 at the same time operating the atomizers, which sprays a coating of grease from the grease tank against the inner surface of the several compartments comprising the utensil. After the utensil has passed the arm 101 is released, the same being spring actuated it automatically throws off the valve, discontinuing the operation of the atomizers.

Having thus fully described my invention, what I claim is:

1. A utensil cleaning and greasing machine comprising a frame, a guide way supported on the frame, means for adjusting the width of the guide way for the accommodation of various sizes of utensils, revolving endless brushes operating above the guide way for contacting with the bottom or exterior of the utensil, a rotating brush operating below the guide way for contacting with the top of the utensil, a pair of vertical rotating brushes located on the sides of the guide way for contacting with the sides of the utensil, an auxiliary brush located on the frame for primarily cleansing the interior of the utensil before the same is placed on the guide way, and an atomizer mechanism controlled by the movement of the utensil by which a coating of grease is applied to the interior of the utensil, substantially as specified.

2. A utensil cleaning and greasing machine comprising a suitable frame, an adjustable guide way formed in the frame, a pair of endless revolving brushes located above the frame and operating across the guide way, the rotating brush located beneath the guide way, a pair of vertical rotating brushes located on the sides of the guide way, a grease tank, atomizers located in the grease tank and an air blast for operating the atomizers spraying a coat of grease on the interior of the utensil conveyed on the guide way, and means for controlling the air blast by the operation of the utensil on the guide way, substantially as specified.

3. A utensil cleaning and greasing machine comprising a frame, an adjustable passage way, a carrier operated in the passage way by which the utensil to be cleaned is conveyed, a plurality of rotating and revolving brushes located in the path of travel, means for adjusting the tension of the revolving brushes, a grease tank located in the line of travel of the utensil, atomizers located in the grease tank, an air blast for operating the atomizers for spraying grease on the inner surface of the utensil, an auxiliary brush located on the frame for primarily cleaning the interior of the utensil before the same is placed on the guide way and a valve operated by the utensil in its travel for controlling the manipulation of atomizers, and shields located above the passage way contacting with the utensil holding the same against the guide way, substantially as specified.

4. A utensil cleaning and greasing machine comprising a frame, endless carriers supported in the frame, a guide way on which a utensil is located and conveyed by the endless carriers, a plurality of rotating and revolving brushes located in the path or guide way between which the utensil is conveyed, means for adjusting the width of the guide way, means for adjusting the tension of the revolving brushes, an atomizer mechanism, and means for automatically controlling the atomizer mechanism by the travel of the utensil for supplying a coat of grease to the interior of the receptacle, substantially as specified.

5. A device of the class described comprising a frame, endless carriers mounted in said frame, a guide way in which the endless carriers operate, an adjusting means for operating one side of the guide way for regulating the width of same, a vertical rotating brush supported on the stationary member of the guide way, a vertical revolving brush supported on the adjustable member of the guide way, a horizontal rotating brush located beneath the guide way, a pair of endless revolving brushes located above the guide way, means for operating all of the brushes simultaneously, a grease tank, atomizers communicating with the grease tank, an air pipe connection communicated with the atomizers for supplying a coat of grease against the interior of a utensil after having been conveyed through the brushes and cleaned, an air blast for blowing into the utensil and removing all loose particles prior to the admission of the grease, and a valve operated by the utensil for controlling the air supply, substantially as specified.

In testimony whereof, I have signed my name to this specification, in presence of two subscribing witnesses.

CHARLES VOLLMER.

Witnesses:
ALFRED A. EICKS,
WALTER C. STEIN.